3,212,178
PROCESS OF ASSEMBLING A TEMPERATURE MEASURING DEVICE WITHIN AN APERTURE OF A FUEL ELEMENT
Michael Lesney Noakes, Earley, Reading, England, assignor to United Kingdom Atomic Energy Authority, London, England
Filed Dec. 7, 1961, Ser. No. 157,776
Claims priority, application Great Britain, Dec. 16, 1960, 43,306/60
4 Claims. (Cl. 29—423)

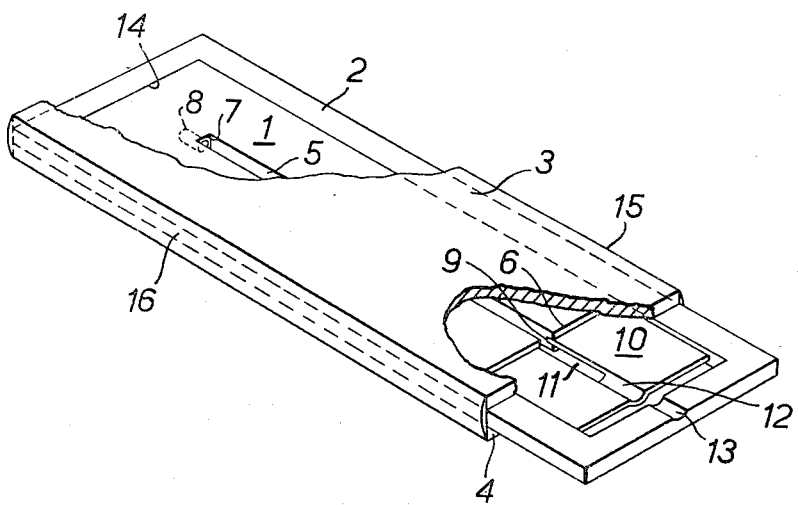

This invention relates to a process of assembling a temperature measuring device within an aperture in a fuel element.

It is advantageous when operating a nuclear reactor to measure the temperature of the fuel as accurately as possible and to this end it is desirable to insert a temperature measuring device within the fuel and thus obtain a direct temperature measurement. Our British Patent No. 844,211 describes a rod type fuel element in which a thermocouple hot junction and the necessary thermocouple cables are inserted within the fuel rod. However, difficulties arise when inserting a temperature measuring device in sheathed fuel plates produced by multiple rolling operations due to the elongation of the plate at each pass through the rolling mill and it has been customary to secure a thermocouple hot junction and cable to an outside surface of the fuel plate by spot welded aluminium clips. This results in considerable disagreement between the measured and the actual fuel temperatures as suggested by calculation.

One object of the present invention is to provide a process whereby a temperature measuring device may be incorporated within a member produced by multiple rolling operations.

It is also an object of the invention to provide a sheathed fuel plate in which the temperature of the fuel can be directly measured.

According to the invention a process for including an insert such as a temperature measuring device in a member produced by multiple stage rolling comprises the steps of inserting a wire in a prepared aperture before the first rolling stage, removing said wire after the first rolling stage and repeating the step with wires of gradually decreasing diameter until after the penultimate rolling stage the device is inserted and the member rolled to final thickness.

Also, in accordance with the invention, a process for inserting a temperature measuring device in the core of a sheathed nuclear reactor fuel plate produced by multiple stage rolling comprises the steps of inserting a wire in a prepared aperture in the core before the first rolling stage, removing said wire after the first rolling stage and repeating the step with wires of gradually decreasing diameter until after the penultimate rolling stage the device is inserted and the fuel plate rolled to final thickness.

Preferably the prepared aperture comprises a longitudinal slot machined in a rectangular plate-like core of the member, said slot extending from an end edge for part of the length of the core, and a socket formed in the end wall of said slot.

Each wire may be prepared for insertion in the member by shot blasting with steel shot to provide a key for a lubricant which is preferably graphite.

Furthermore, in accordance with the invention, a sheathed fuel plate for a nuclear reactor comprises a core of nuclear fuel and a temperature measuring device in direct contact with the fuel.

To enable the nature of the invention to be more readily understood one example of a sheathed nuclear reactor fuel plate formed in accordance with the process of the invention will be described with reference to the accompanying drawing.

The drawing is a fragmentary pictorial view of an initial fuel pack assembly during the manufacture of a nuclear fuel plate.

Referring to the drawing the fuel pack assembly comprises a fuel core 1 located within an aluminium frame 2 and sandwiched between two aluminium cladding plates 3 and 4. The fuel core is rectangular in shape 7.50 ins. long 2.32 ins. wide and is stamped out of a strip of uranium aluminium alloy 0.065 in. thick. A longitudinal slot 5, 0.060 in. wide is machined through the core, and extends from an edge 6 partly along the length of the core. It will be appreciated that the length and transverse position of the slot is determined by the position at which it is desired to measure the temperature of the fuel. In the instant embodiment the slot is 6 ins. long and centrally arranged relative to the width of the core 1. A hole 0.043 in. diameter and .125 in. deep is drilled in the end wall 7 of slot 5 to form a socket 8 for a thermocouple hot junction (not shown). The edge 6 of core 1 is also provided with a groove or channel 9 to receive the end of a thin aluminium shim 10.

Shim 10 is provided with a slot 11, which registers with slot 5 when the shim 10 is placed in position between edge 6 of the core 1 and the frame 2. Slot 11, extends for part of the length of shim 10 and merges into a channel 12 which in turn registers with a channel 13 formed on frame 2.

Before assembling the fuel pack, both sides of the core 1 and the corresponding sides of the cladding plates 3 and 4 are degreased and scratch brushed. The cladding plates are also jig lubricated to ensure that a layer of lubricant covers that portion of the surface of each plate which registers with slot 5.

To assemble the fuel pack, the shim 10 is placed in position, the edge 6 of the core crimped to secure the end of shim 10 in channel 9, and the core 1 press fitted into frame 2, care being taken to ensure that an edge 14 of the core abuts frame 2. The edges and sides of slot 5 are lubricated with graphite and a first graphite lubricated wire 0.049 in. diameter is inserted in the slot. The end portion of this wire is reduced to 0.043 in. diameter for .25 in. of its length to permit the end of the wire to enter socket 8. The cladding plates 3 and 4 are then placed in position and the complete fuel pack assembly argon-arc welded along the longitudinal edges 15 and 16. After assembly the first wire is withdrawn from the slot 5 and the fuel pack placed in a furnace and heated to 600° C. for 30 minutes.

The first wire is re-inserted in slot 5 and the fuel pack passed through a unidirectional rolling mill in which the rolls are heated to reduce the heat drop in the fuel pack during the rolling. The fuel pack is reduced in thickness from an initial thickness of 0.1875 in. to a first stage rolling thickness of 0.125 in. and a length of 11.375 ins. The fuel pack is reheated at 600° C. for 10 minutes and the first wire withdrawn.

The fuel pack is further heated for 20 minutes at the same temperature and a second graphite lubricated wire 0.045 in. diameter inserted in slot 5, the end of this wire being also reduced to 0.043 in. diameter for 0.25 in. length to permit its end to enter socket 8. The fuel pack is then passed through the rolling mill again and reduced in thickness from 0.125 in. to a second stage rolling thickness of 0.085 in. and a length of 16.5 ins. The fuel pack is returned to the furnace, heated for 10 minutes at 600° C. and the second wire withdrawn.

The thermocouple hot junction is inserted in socket 8, and the associated thermocouple cable (0.040 in. diameter) inserted in slot 5, the fuel pack is then reheated for 20 minutes at 600° C. and passed through the rolling mill for a final reduction in thickness to 0.056 in. and a length of 23.625 ins. The resultant fuel plate is then trimmed to size.

If desired, a long drill 0.043 in. diameter may be used to clean out the slot 5 between the withdrawal of the smallest wire and the insertion of the thermocouple. This is particularly advantageous when it is required to insert more than one thermocouple in the core at exactly the same distance from the end of the plate.

It will be appreciated that various tests, for example radiographic tests, are carried out at various stages of manufacture to ensure the correct positioning of the wires, and the thermocouple may be tested, by measuring the furnace temperature, during the final heating stage.

It has been found advantageous to prepare the wires by shot blasting with steel shot to provide a key for the graphite lubricant applied to the wires before insertion in the pack.

It will be further appreciated that more than one thermocouple may be required in a fuel plate and it has been found that three such thermocouple hot junctions can be incorporated in a fuel plate using the process of the invention.

I claim:

1. A process for inserting a temperature measuring device in the fuel core of a sheathed nuclear reactor fuel plate produced by multiple stage rolling comprising the steps of inserting a wire in a prepared aperture in the fuel core before the first rolling stage, removing said wire after the first rolling stage, and repeating the steps with wires of gradually decreasing diameter until after the penultimate rolling stage the device is inserted in said aperture and the fuel plate rolled to final thickness.

2. A process as claimed in claim 1 wherein the prepared aperture comprises a longitudinal slot machined in the fuel core, said slot extending from an end edge for part of the length of the fuel core and having a socket formed in the end wall of said slot.

3. A process as claimed in claim 2 wherein each wire is prepared for insertion in the member by shot blasting with steel shot to provide a key for a lubricant.

4. A process as claimed in claim 3 wherein the lubricant is graphite.

References Cited by the Examiner
UNITED STATES PATENTS

| | | | |
|---|---|---|---|
| 2,005,315 | 6/35 | Goodhue | 29—18 |
| 2,021,945 | 11/35 | Payne | 29—423 |
| 2,179,461 | 11/39 | Yoder | 29—18 |
| 2,300,353 | 10/42 | Eberhardt | 29—423 |
| 2,863,816 | 12/58 | Stacy | 204—193.2 |
| 2,914,454 | 11/59 | Gurinsky et al. | 204—193.2 |

WHITMORE A. WILTZ, *Primary Examiner.*

OSCAR R. VERTIZ, THOMAS H. EAGER, *Examiners.*